United States Patent
Kempe

(10) Patent No.: US 6,381,023 B1
(45) Date of Patent: Apr. 30, 2002

(54) CONFOCAL HETERODYNE INTERFERENCE MICROSCOPY

(75) Inventor: Michael Kempe, Potsdam (DE)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 09/680,633

(22) Filed: Oct. 6, 2000

Related U.S. Application Data

(63) Continuation of application No. 09/086,117, filed on May 28, 1998, now Pat. No. 6,151,127.

(51) Int. Cl.[7] ................................................ G01B 9/02
(52) U.S. Cl. ...................................... 356/484; 356/485
(58) Field of Search ................................ 356/484, 485, 356/489, 479, 497, 496, 511; 359/370

(56) References Cited

U.S. PATENT DOCUMENTS

| | | |
|---|---|---|
| 4,632,554 A | 12/1986 | Pearce |
| 4,904,082 A | 2/1990 | Waters |
| 4,965,441 A | 10/1990 | Picard |
| 5,268,741 A | 12/1993 | Chou et al. |
| 5,293,215 A * | 3/1994 | Pfendler et al. ............ 356/489 |
| 5,321,501 A | 6/1994 | Swanson et al. |
| 5,343,290 A | 8/1994 | Batchelder et al. |
| 5,355,252 A | 10/1994 | Haraguchi |
| 5,452,088 A | 9/1995 | Ai |
| 5,459,570 A | 10/1995 | Swanson et al. |
| 5,465,147 A | 11/1995 | Swanson |
| 5,477,319 A | 12/1995 | Shimonaka et al. |
| 5,491,552 A | 2/1996 | Knuttel |
| 5,493,109 A | 2/1996 | Wei et al. |
| 5,491,524 A | 3/1996 | Hellmuth et al. |
| 5,501,226 A | 3/1996 | Petersen et al. |
| 5,549,114 A | 9/1996 | Petersen et al. |
| 5,555,087 A | 9/1996 | Miyagawa et al. |
| 5,570,182 A | 10/1996 | Nathel et al. |
| 5,625,613 A | 4/1997 | Kato et al. |
| 5,827,971 A | 10/1998 | Hale et al. |
| 6,015,969 A * | 1/2000 | Nathel et al. ................ 356/479 |
| 6,151,127 A * | 11/2000 | Kempe .......................... 356/484 |

OTHER PUBLICATIONS

J. A. Izatt et al., Optical Coherence Tomography for Biodiagnostics, Optics and Photonics News, vol. 8, No. 5, pp. 41–47, 1997.

G. S. Kino and S. S. C. Chim, Mirau Correlation Microscope, Applied Optics, vol. 29, No. 26, pp. 3775–3783, 1990.

M. Kempe and W. Rudolph, Analysis of Heterodyne and Confocal Microscopy for Illumination with Broad–bandwidth Light, Journal of Modern Optics, vol. 43, No. 10, pp. 2189–2204, 1996.

* cited by examiner

Primary Examiner—Samuel A. Turner
(74) Attorney, Agent, or Firm—Kenneth J. Lukacher

(57) ABSTRACT

An improved confocal microscope system is provided which images sections of tissue utilizing heterodyne detection. The system has a synthesized light source for producing a single beam of light of multiple, different wavelengths using multiple laser sources. The beam from the synthesized light source is split into an imaging beam and a reference beam. The phase of the reference beam is then modulated, while confocal optics scan and focus the imaging beam below the surface of the tissue and collect from the tissue returned light of the imaging beam. The returned light of the imaging beam and the modulated reference beam are combined into a return beam, such that they spatially overlap and interact to produce heterodyne components. The return beam is detected by a photodetector which converts the amplitude of the return beam into electrical signals in accordance with the heterodyne components. The signals are demodulated and processed to produce an image of the tissue section on a display. The system enables the numerical aperture of the confocal optics to be reduced without degrading the performance of the system.

41 Claims, 3 Drawing Sheets

CONFOCAL HETERODYNE INTERFERENCE MICROSCOPY

This application is a continuation of application Ser. No. 09/086,117 filed May 28, 1998 now U.S. Pat. No. 6,151,127.

FIELD OF THE INVENTION

The present invention relates to confocal microscopy for examination of objects, such as biological tissue, and particularly to a confocal microscope system for scanning below the surface of tissue, which utilizes heterodyne detection to produce confocal images of tissue sections. This invention is especially suitable for providing an instrument for dermal or surgical pathology applications.

BACKGROUND OF THE INVENTION

Confocal microscopy involves scanning a tissue to produce microscopic images of a slice or section of tissue. Such microscopic imaged sections may be made in-vivo and can image at cellular resolutions. Examples of confocal scanning microscopes are found in Milind Rajadhyaksha et al., "In vivo Confocal Scanning Laser Microscopy of Human Skin: Melanin provides strong contrast," The Journal of Investigative Dermatology, Volume 104, No. 6, June 1995, pages 1–7, and more recently, in Milind Rajadhyaksha et al., "Confocal laser microscope images tissue in vivo," Laser Focus World, February 1997, pages 119–127. These systems have confocal optics which direct light to tissue and image the returned reflected light. Such confocal microscope systems can focus and resolve a narrow width of tissue as an imaged section, such that tissue structures can be viewed at particular depths within the tissue, thereby avoiding evasive biopsy procedures for pathological examination of the tissue, or allow pathological examination of unprepared excised tissue.

Two parameters which effect the performance of confocal microscope systems in imaging tissue sections are the numerical aperture (NA) of the optics and the wavelength of the beam scanned through the tissue. The axial resolution, i.e., the thickness of the imaged section, and lateral resolution of confocal microscope systems are directly proportional to the wavelength of the light source and inversely proportional to $NA^2$ (axial) and NA (lateral). In other words, the higher the NA, the thinner the imaged section, while the lower the NA, the thicker the imaged section. Both the axial resolution and the lateral resolution are optimized in a confocal microscope system suitable for pathological examination to the dimensions of the tissue structures, such as cells, which are of interest. As discussed in the Milind Rajadhyaksha et al. article appearing in Laser Focus World, February 1997, the use of a near-infrared light source between about 700 nm and 1200 nm and optics with a NA of about 0.7–0.9 have provided optimal results for imaging tissue sections with sufficient discrimination of cellular level structures. One problem with using optics providing NA values about this range is that they are large and expensive, particularly for the objective lens which focuses light into and collects light from the tissue, and are very sensitive to aberrations, such as introduced by the object being imaged. Accordingly, it is desirable to provide imaging of tissue sections in a confocal microscope using lower cost and smaller optics having a NA below 0.7 without sacrificing imaging performance, in particular depth discrimination and scattered light rejection.

Accordingly, it is a feature of the present invention to improve confocal microscopy by combining the depth response of confocal imaging with the coherence function of heterodyne detection using a synthesized beam of multiple wavelengths of light, such that lower NA confocal optics and inexpensive laser diode sources may be used. Heterodyne detection has been proposed for imaging in U.S. Pat. No. 5,459,570, which describes an apparatus using an optical coherence domain reflectometer for providing images of a tissue sample to perform optical measurements. However, this apparatus is limited in depth resolution and does not utilize confocal optics for microscopic imaging. Other optical systems have used multiple wavelengths of light, but are limited to generating interference patterns for visualizing fringes characterizing the surface of objects, such as shown in U.S. Pat. No. 5,452,088, which describes a multi-mode laser apparatus for eliminating background interference, and U.S. Pat. No. 4,632,554, which describes a multiple frequency laser interference microscope for viewing refractive index variations. Such interferometric-based optical systems have no confocal optics or heterodyne detection, nor do they provide imaging within a tissue sample. A confocal microscope using multiple wavelengths of light has been proposed in U.S. Pat. No. 4,965,441, but this microscope is limited to focusing at different altitudes for surface examination of an object and does not have heterodyne detection.

SUMMARY OF THE INVENTION

It is the principal object of the present invention to provide an improved confocal microscopy method and confocal microscope system for imaging sections of tissue using heterodyne detection.

It is another object of the present invention to provide an improved confocal microscope system for imaging tissue using a synthesized light source to produce a beam having different wavelengths, in which the synthesized light source combines beams from multiple light sources producing light at each of the different wavelengths.

It is another object of the present invention to provide an improved confocal microscope system for imaging which can use low NA confocal optics, such as below 0.7, while achieving imaging performance in terms of axial resolution equivalent to prior art confocal microscope systems using higher NA confocal optics, such as between 0.7 and 0.9.

Briefly described, the system embodying the present invention includes a synthesized light source for producing a single beam of light of multiple, different wavelengths from multiple laser sources, and a first beam splitter for separating the single beam into an imaging beam and a reference beam. The phase of the reference beam is modulated by an optical modulator, while confocal optics scan and focus the imaging beam below the surface of the tissue and collect returned light of the imaging beam from the tissue. A second beam splitter is provided for interacting the returned light of the imaging beam with the modulated reference beam to provide a combined return beam having heterodyne components. The heterodyne components in the return beam represent the spatial overlapping of the imaging and reference beams over the bandwidth of the different wavelengths produced by the synthesized light source. The return beam is received by a photodetector which converts the amplitude of the light of the return beam into electrical signals in accordance with such heterodyne components representative of the tissue section. The electrical signals are then processed by a controller, such as a computer, to produce an image of the tissue section on a display coupled to the controller.

To promote the interaction of the imaging and reference beams in the return beam, the path lengths of the imaging and reference beams are matched such that the difference between their path lengths are approximately equal to integer multiples of the separation of the peaks in the coherence function produced by the synthesized light source.

The performance of the system, in terms of the axial resolution of the imaged tissue section, depends on the numerical aperture (NA) of the confocal optics and the multiple, different wavelengths of the beam produced by the synthesized light source, such that lower NA optics can be used to provide an axial resolution previously afforded by confocal microscope systems using higher NA optics between 0.7 and 0.9.

The system improves confocal microscopy by combining the axial resolution of confocal detection and the axial ranging of heterodyne detection of light with a coherence function, that is preferably periodic, to provide an axial (depth) resolution that is an improvement over that provided by confocal or heterodyne detection alone. It is believed that the heterodyne components are produced by overlapping one of the peaks of the coherence function with the broader depth response of the confocal optics, while all the other peaks do not contribute to the image of the tissue due to suppression by the confocal depth response. The signal is spatially limited to a region of said tissue in the focal plane along which the confocal optics scan and focus the imaging beam in the tissue.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1:
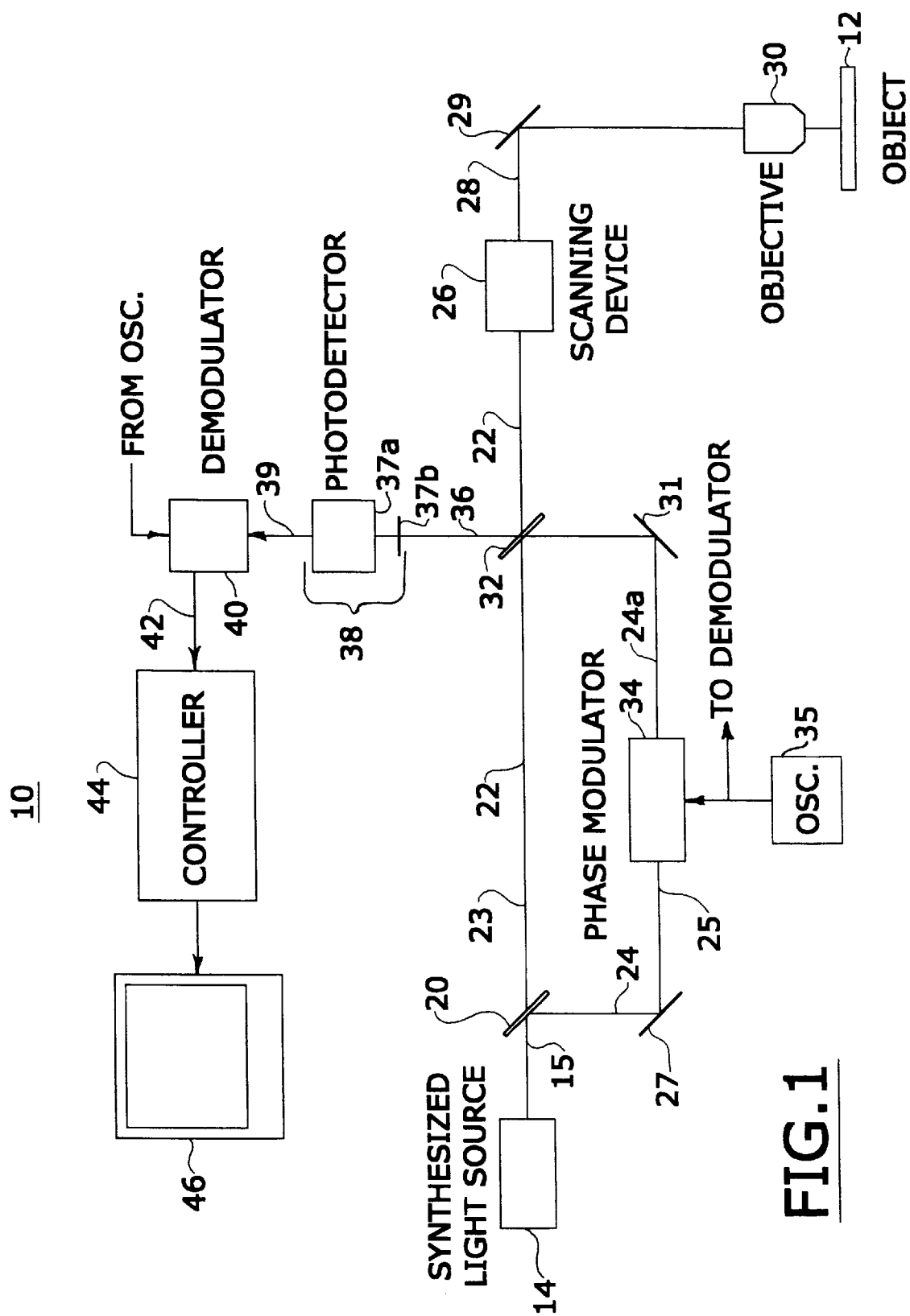
FIG. 1 is a block diagram of the system in accordance with the present invention.

Referring to FIG. 1, a confocal microscope system 10 is shown for producing images of sections of an object 12, such as a tissue sample or in-vivo tissue of patient, below the surface of the object. System 10 includes a synthesized light source 14 providing a single beam 15 having several, different wavelengths of light. Synthesized light source 14 includes a number (N) of multiple light sources each providing light beams at a different wavelength, which are combined into a single beam 15. Beam 15 thus represents light that has a coherence function with narrow peaks depending on the wavelengths (or frequencies) of each of the multiple light sources of synthesized light source 14. The wavelengths of the light sources of the synthesized light source are selected to be transparent to object 12 to a particular depth from the object's surface. For tissue, such transparency occurs in the infrared spectrum of light.

Figure 2:
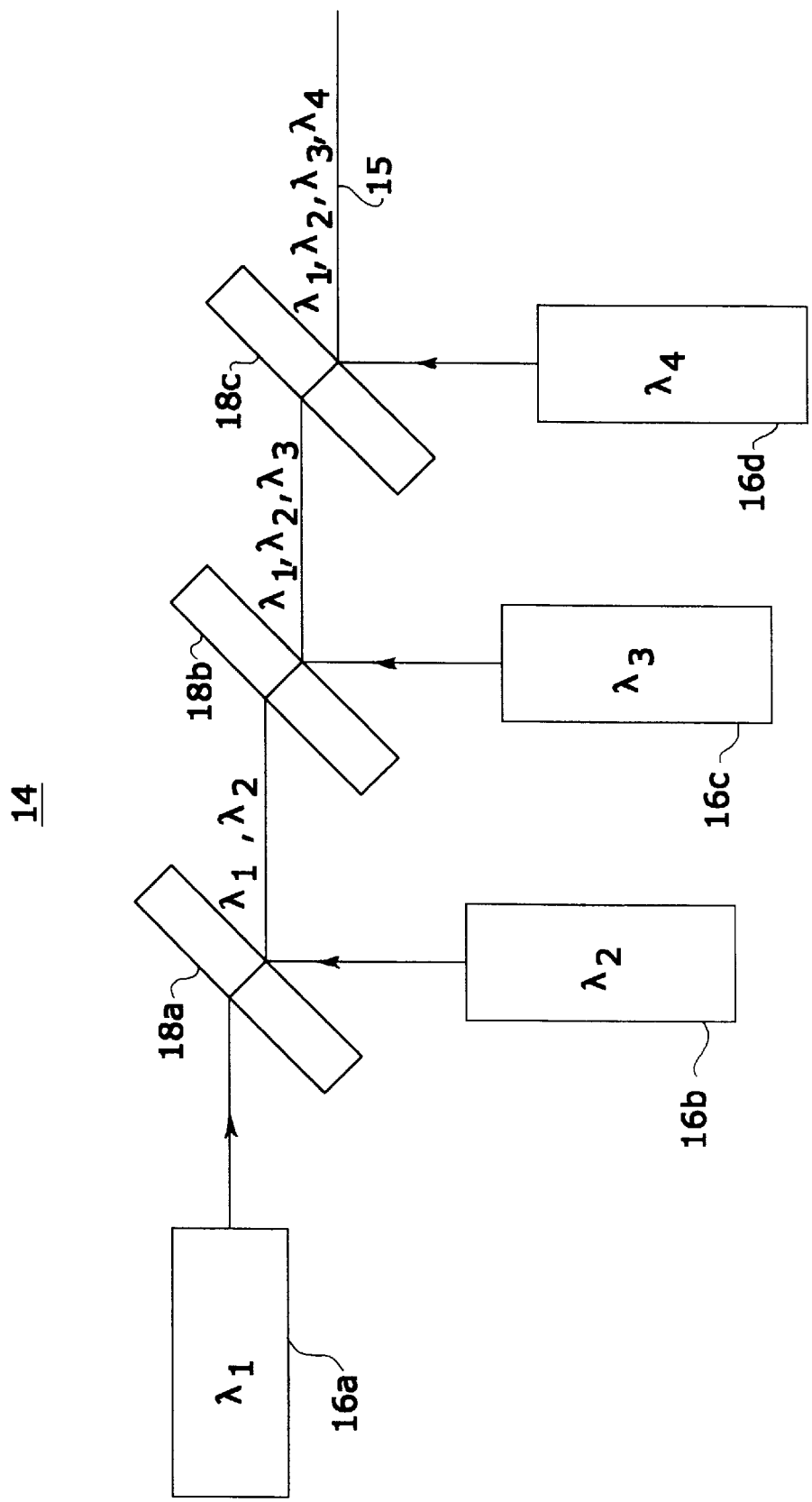
FIG. 2 is a block diagram of the synthesized light source of FIG. 1.

An example of synthesized light source 14 with four light sources (N=4) is shown in FIG. 2 in which the light sources are represented by laser modules 16. The four laser modules 16 each provide a beam at a different wavelength (or band) $\lambda_1$, $\lambda_2$, $\lambda_3$, and $\lambda_4$, respectively. Preferably, the wavelengths satisfy the equation $\lambda_4 < \lambda_3 < \lambda_2 < \lambda_1$ and the wavelengths are equally separate from each other, such as at 80 nm intervals in the range of 700 nm to 1200 nm. Each beam is successively combined by dichroic beam splitters 18 to provide a single beam 15 of discrete wavelengths (or bands) $\lambda_1$, $\lambda_2$, $\lambda_3$, and $\lambda_4$. Specifically, the beam ($\lambda_1$) from laser modules 16a and the beam ($\lambda_2$) from laser module 16b are combined by beam splitter 18a. The beam ($\lambda_1, \lambda_2$) from beam splitter 18a is then combined by a beam splitter 18b with the beam ($\lambda_3$) from laser module 16c. The beam ($\lambda_1, \lambda_2, \lambda_3$) from beam splitter 18b is next combined with the beam ($\lambda_4$) from laser module 16d to provide beam 15 ($\lambda_1, \lambda_2, \lambda_3, \lambda_4$). Any number of beams may be combined in this manner. Each beam splitter 18 maximally transmits each wavelength, for example, beam splitter 18c may have transmission greater than 95% for each wavelength band $\lambda_1, \lambda_2, \lambda_3$. Similarly, each beam splitter reflects maximally the wavelength to be combined. For example, beam splitter 18c reflects $\lambda_4$ with reflectivity greater than 95%. The laser modules 16 may use diode lasers to produce a beam of high brightness which are either fixed, or tunable, to a desired wavelength, and have sufficiently large coherence lengths, such as greater than 1 mm, and may be for example the following commercially available laser diodes Toshiba TOLD9215, Sanyo SDL3034, Sanyo SDL4032, and EG&G C86136, C86125E.

Returning to FIG. 1, beam 15 from synthesized light source 14 is split by a beam splitter 20 into an imaging beam 22, which travels along an image arm 23 of system 10, and a reference beam 24, which travels along a reference arm 25 of the system. Beam splitter 20 may be a non-polarizing beam splitter having similar optical transmission properties for each of the different wavelengths of synthesized light source 14, so that the merging of each wavelength is combined additively and linearly. For example, if synthesized light source 14 has two light sources, beam splitter 20 would be approximately 50/50 (equally transmissive) for the wavelength band of each source.

The imaging beam 22, passing through a beam splitter 32, is incident on a scanning device 26 for deflecting the beam 22 into a scanning beam 28 that is focused by an objective lens 30 into object 12. The multiple wavelength imaging beam is thus scanned and focused to a polychromatic spot at a depth into the object (i.e., below the surface of the object). The scanning device 26 may be a typical scanning mechanism for two-dimensional imaging, such as a rotating polygon mirror for scanning in a first direction, and a galvomirror which deflects the beam in a second direction. Other scanning mechanisms may also be used, such as one or two positionable galvomirrors. A relay mirror 29 may be provided to deflect the scanning beam to objective lens 30.

The imaging beam is returned from the surface or internal section of the object 12 to be imaged. Objective lens 30 collects the reflected light of the imaging beam 22 from the object 12, and such collected light is deflected via relay mirror 29 and scanning device 26 to beam splitter 32.

The reference beam 24 is transmitted, via relay mirror 27, to a phase modulator 34, such as an acousto-optic modulator, which is operated by a signal from a CW oscillator 35, to modulate beam 24, and hence each wavelength of the beam, by a certain frequency produced by oscillator 35, such as 100 MHz. The frequency of the phase modulation does not vary during scanning by scanning device 26, and should be greater than the scan frequency, i.e., the velocity of the scanning beam at the object divided by the lateral resolution. Alternatively, the acousto-optic modulator may be replaced by a piezo-actuated moving mirror which produces a frequency (Doppler) shift in the reference beam, or by an electro-optical modulator. The modulated reference beam 24a is deflected, via relay mirror 31, to a beam splitter 32.

At beam splitter 32, the modulated reference beam 24a and the imaging beam light returning from the object 12 are combined into a return beam 36, so that the modulated reference beam and the imaging beam returned light spatially overlap and interact to produce heterodyne components in the return beam 36. Beam splitter 32 may be a non-polarizing beam splitter having similar optical transmission properties for the different wavelength bands of light from synthesized light source 14.

The return beam 36 is incident on a photodetector 38. Photodetector 38 may consist of a single photo-diode detector 37a and a confocal aperture 37b, such as a pinhole, in the path of return beam 36. Aperture 37b reduces the amount of stray light that falls on detector 37a. It is believed that spatial limiting (filtering) detection to a particular region in the focal plane of the scanned imaging beam may be provided by the use of heterodyne detection in which the reference beam acts as an aperture for the returned light of the imaging beam from the object. Alternatively, or in combination, aperture 37b provides for such spatial filtering. Photodetector 38 may also be accomplished by a lens (not shown) which has a focal power which overfills photo-diode 37a, instead of confocal aperture 37b. The synthesized light source 14, beam splitters 20 and 32, scanning device 26, objective lens 30, and photodetector 38, represent the confocal optics of system 10, and may be similar to those used by a typical confocal imaging system, except that a synthesized light source is used rather than conventional monochromatic light source illumination.

Photodetector 37a of the photodetector assembly 38 produces an electrical signal 39 in response to the amplitude of the light incident upon the photodetector in the range of the different wavelengths of the synthesized light source. Signal 39 is inputted to a demodulator 40, which operates at the same modulating frequency as phase modulator 34 to demodulate the signal, such that the electrical output signal 42 from demodulator 40 is directly proportional to the amplitude of the modulation in signal 39. Demodulator 40 may operate via an input signal from oscillator 35, if needed, however the demodulator is not sensitive to the phase of signal 39.

For example, demodulator 40 may operate by typical amplitude demodulation (similar to demodulation of an AM radio), or demodulation as described in U.S. Pat. No. 5,459,570.

A controller 44 is provided in system 10 which receives the output signal 42 from the demodulator and generates an image on a display (or CRT) 46 responsive to signal 42 as successive frames in real-time, in accordance with the scanning pattern of scanning device 26. For example, controller 44 may sample signal 42 to acquire data represent successive raster lines of an image correlated to the scanning mechanism as it scans the imaging beam successively across the object. Controller 44 may also enable and disable the operation of system 10 by controlling the light source 14, scanning device 26, phase modulator 34, oscillator 35, and demodulator 40, via control lines not shown. Optionally, the position of the scanning device 26 during the scan may be monitored or controlled by the controller 44. The controller may be a computer, such as a PC, which uses typical display driving software for producing images on display 46 coupled to the computer.

In system 10, the imaging beam 22 and reference beam 24 desirably are both beams of collimated light. This may be provided by assuring that beam 15 from synthesized laser source 14 is collimated by the optics ahead of the beam splitter 20 before being split into the imaging and reference beams. If needed, a collimation telescope or lens may be used with the beam from each of the light sources of the synthesized light source 14 to achieve such collimation of beam 15. By using collimated light in system 10, the imaging and reference beam waves will have the same phase curvature at photodetector 37a, such that they spatially overlap and interact (by interference) with each other in the return beam 36 at the photodetector 37a to produce heterodyne components.

The imaging beam travels along the image arm path which represents the path of the imaging beam 22 from beam splitter 20 to object 12 and the returned light from the object to beam splitter 32, while the reference beam travels along the reference arm path which represents the path from beam splitter 20 through modulator 34 to beam splitter 32. The lengths of the reference arm path and the image arm path are matched in system 10 so that the imaging beam and reference beam interact to produce heterodyne components. Matching of the reference arm and image arm paths occurs when the difference in length of the two paths are approximately equal to integer multiples of the separation of the peaks of the coherence function of the synthesized light source 15. This separation is dependent on each of the different wavelengths of light produced by the synthesized light source. In the case of two light sources within synthesized light source 14, correction of any mismatch between the reference and image arm paths lengths may be achieved by turning off one laser source first (which gives the confocal response) and then, with both laser sources on, adjusting the reference arm length using the confocal image on display 46 as a template. With more that two wavelengths the above procedure can be repeated for each wavelength used.

The performance of system 10 in terms of axial resolution of the imaged tissue section depends on the number of light sources in the synthesized light source 14, the wavelengths of such light sources, and the NA of the confocal optics of the system. Table I below shows an example of the performance of system 10 using the combination of any two (N=2) of five different light sources at wavelengths 670 nm, 780 nm, 830 nm, 905 nm, and 1050 mn, respectively. For each pair of wavelengths in a column and row of Table I, the optimum (or actual) NA of the confocal optics for use with such wavelengths is first indicated, and then the benefit in axial resolution provided is shown by the arrow to the NA which would be required of the confocal optics to obtain such axial resolution at the lower of the two wavelengths.

TABLE I

| $\lambda$ (nm) | 670 | 780 | 830 | 905 | 1050 |
|---|---|---|---|---|---|
| 670 | x | 0.53 → 0.69 | 0.62 → 0.79 | 0.71 → 0.87 | 0.83 → 0.95 |
| 780 | | x | 0.35 → 0.48 | 0.52 → 0.69 | 0.71 → 0.87 |
| 830 | | | x | 0.40 → 0.55 | 0.64 → 0.81 |
| 905 | | | | x | 0.52 → 0.69 |
| 1050 | | | | | x |

For example, using two light sources in synthesized light source 14 which operate at wavelengths 670 nm and 830 nm, respectively, and confocal optics having an NA of 0.62, the axial resolution provided by the system is the same as if such confocal optics had an NA of 0.79 and the synthesized light source where substituted for a single light source at 670 nm. Optimal results in Table I, where the actual NA is the lowest and provides performance near the NA range of 0.7 to 0.9, occurs at combinations of wavelengths 670 nm and 780 nm, 780 nm and 905 nm, and 905 nm and 1050 nm. Accordingly, lower NA confocal optics can be used to produce the same axial resolution afforded by higher NA confocal optics in prior art single light source confocal microscope systems. Furthermore, if all five light sources of Table I were used in system 10, the optimum NA of the confocal optics is 0.47 and the axial resolution provided by the depth response is equivalent using confocal optics with an NA of 0.8 with only a single light source at 670 nm.

Preferably, only two laser sources are used to reduce the complexity of the system, however, more than two laser sources may be provided such that combinations of all or some of their wavelengths may be used to provide the desired response of system 10. Thus, the illumination provided by the synthesized light source provides freedom in the choice of the bandwidth over the different wavelengths of such illumination.

In imaging tissue sections by system 10, longitudinal chromatic aberrations may be corrected, if needed, by individually adjusting the position of the focus for each wavelength produced by the synthesized light source. Spherical aberrations in the system, introduced primarily by the sample, may be reduced by the use of index matching material between the objective lens and the object, or by the use of an index matched immersion objective lens. The use of low NA confocal optics may further reduce spherical aberration. Objective lens 30 may be either a dry or immersion objective lens 30, although penetration depth of the scanning beam may be improved by the use of an immersion objective lens.

The following theoretical explanation is given in order to demonstrate the improvement obtained by means of heterodyne detection in accordance with the invention. The presentation of the explanation does not imply limitation of the invention to any theory of operation. The explanation uses the following terms, equations and parameters presented below.

N is the number of light sources in the synthesized light source in which $\lambda_N$ is the wavelength of the Nth source. For example, $\lambda_1$ is the wavelength of the first source, and $\lambda_2$ is the wavelength of the second light source. This explanation considers two light sources in order to simplify the mathematics, in which the spectral intensity of the beams provided by each source is equal to I. $\lambda_0$ is the center wavelength between the two wavelengths $\lambda_1$ and $\lambda_2$, and $\omega_0$ is the center frequency between the frequency of the two sources. $\Delta z$ is the axial distance of the object plane from the focal plane, and k is the wave vector of the illumination at the center frequency $\omega_0$, where $k=\omega_0/c=2\pi/\lambda_0$. a is the half-angle of the objective lens aperture. The numerical aperture NA is $NA=n\sin\alpha$. The depth response, i.e., the square of demodulated signal from a planar reflector as a function of $\Delta z$, is as follows:

$$S^2(\Delta z) = I^2 \left| \frac{\sin[2k\Delta z \sin^2(\alpha/2)]}{2k\Delta z \sin^2(\alpha/2)} \cos[(\lambda_2 - \lambda_1)/\lambda_0 k \Delta z] \right|^2 \quad (1)$$

The first term of this equation represents the confocal response, which is modified by the second term, representing the field correlation function provided by the synthesized light source. The maximum improvement in the depth response occurs if the sine function of the confocal response term and the cosine function in the field correlation term are oscillating at the same frequency, i.e., if $$(\lambda_2 - \lambda_1)/\lambda_0 = 2\sin^2(\alpha/2) \quad (2)$$

then, the depth response becomes $$S^2(\Delta z) = I^2 \left| \frac{\sin[4k\Delta z \sin^2(\alpha/2)]}{4k\Delta z \sin^2(\alpha/2)} \right|^2 \quad (3)$$

which is twofold narrower than the confocal response at $\lambda_0$, The confocal response at $\lambda_0$ being Equation (1) absent the second term, $\cos[(\lambda_2-\lambda_1)/\lambda_0 k\Delta z]$.

Since the field correlation function modifying the confocal response in Equation (1), $\cos(\Delta\lambda/\lambda_0 k\Delta z)$, is periodic, any mismatch between the optical length of reference and image arm paths may be corrected within the confocal depth response, for example, within less than 20 µm. The worst mismatch possible occurs if the length of the reference arm is $\Delta z=3.2/(4k\sin^2(\alpha/2))$ away from the next optimum matching point where the interaction of the imaging and reference beams generate heterodyne components.

Figure 3:
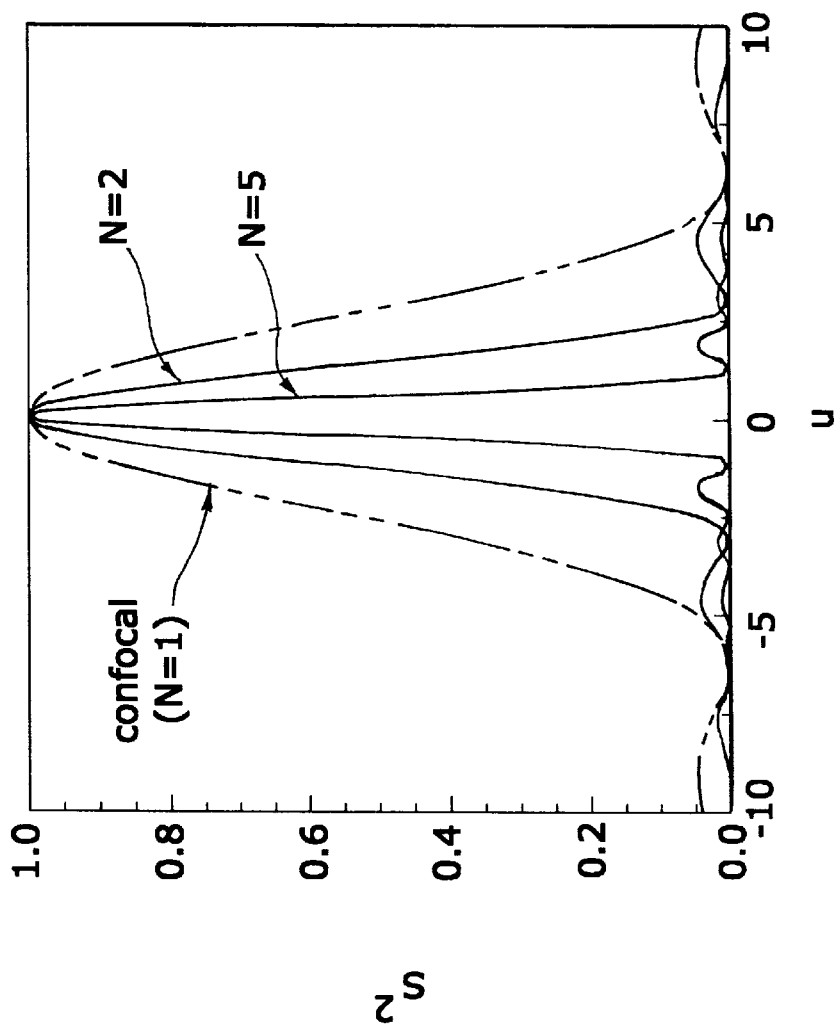
FIG. 3 is a graph showing an example of the axial resolution of the system of FIG. 1 in terms of depth response.

Referring to FIG. 3, the depth response using two light sources (N=2) with equidistant wavelength separation $\Delta\lambda$ and five light sources (N=5) in synthesized light source 14 is shown as a function of the unit u, where $u=4k\Delta z \sin^2(\alpha/2)$. For an odd number N of light sources with equidistant wavelength separation in synthesized light source 14, the depth response of Equation (3) is $$S^2(u) = \left| \frac{\sin[Nu/2]}{u/2} \right|^2$$

The depth response narrows as N increases, i.e., as the number of different wavelengths which are used increases. The depth response of a single light source (N=1) is also illustrated in FIG. 3 for purposes of showing the narrowing depth response provided by using multiple, different wavelengths of light.

As discussed in connection with Table I, the improvement in depth response by using more than one light source is comparable to the effect of the increase of axial resolution by the use of higher NA confocal optics in system 10. For example, if a single light source were used, instead of synthesized light source 14, at wavelength 820 nm with confocal optics providing a NA of 0.2, the lateral resolution of system 10 would be $3.32/(k\sin\alpha)\approx2.2$ µm and the axial resolution would be $5.56/(4k\sin^2(\alpha/2))\approx18.0$ µm. However, if the synthesized light source is used with two light sources at wavelengths 812 nm and 828 nm, the axial resolution of the system can be reduced in half to 9 µm using the same confocal optics. In this example, the reference and image arm path length mismatch may be corrected within a range of about ±10 µm with a sensitivity of 1 µm.

The optimum NA for the confocal optics in system 10 using multiple wavelengths is determined by Equation (2) if the wavelength separation is of equal amount $\Delta\lambda=\lambda_2-\lambda_1$. In other words, the wavelengths are equally separated from each other by $\Delta\lambda$. For synthesized light source 14, the choice of NA should be such that the confocal response of the optical system suppresses all except one of the peaks of the coherence function of the synthesized light source. The adjustment of the system may be easily facilitated by the wavelengths of the synthesized light source 14 being spaced equidistant from each other, thereby producing a periodic coherence function. In this case, any peak of the coherence function can be chosen to coincide with the peak of the confocal depth response by adjusting the arm length mismatch between image arm and reference arm.

By utilizing synthesized light source 14 for illumination of object 12 and detection at photodetector 37a of the heterodyne interaction of the imaging and reference beams, the performance of the system 10 in terms of axial resolution (and contrast) is improved beyond that limited by the NA of the confocal optics of the system (which primarily is due to the NA of objective lens 30). It is believed that the depth discrimination imposed by the temporal field correlation of the synthesized light source 14 in combination with the axial resolution of the confocal optics improves the ability or resolution of the confocal optics, enabling a user of the microscope system 10 to better distinguish cellular level tissue structures in the imaged section of object 12 on display 46.

From the foregoing description, it will be apparent that an improved confocal microscope system and method for confocal microscopy utilizing heterodyne detection has been provided. Variations and modifications of the herein described system and method and other applications for the invention will undoubtedly suggest themselves to those skilled in the art. Accordingly, the foregoing description should be taken as illustrative and not in a limiting sense.

What is claimed is:

1. A confocal microscope system for imaging sections of tissue below the surface of said tissue comprising:
    a light source for providing a single beam of long coherence length light having a plurality of different non-overlapping wavelength bands;
    first optics for separating said single beam into an imaging beam and a reference beam;
    an optical modulator for modulating the phase of said reference beam;
    confocal optics for scanning and focusing said imaging beam below the surface of said tissue and collecting returned light of said imaging beam from said tissue;
    second optics for interacting said returned light with said modulated reference beam to provide a combined return beam which has heterodyne components;
    a detector which receives said return beam and produces electrical signals corresponding to said components; and
    means for processing said electrical signals to produce an image of said tissue section.

2. The system according to claim 1 wherein said single beam from said light source defines a coherence function having peaks in accordance with said different wavelength bands, and said imaging beam transverses along a first path from said first optics to said tissue and from said tissue to said second optics, and said reference beam transverses along a second path from said first optics through said optical modulator to said second optics, in which the difference in length of said first path from said second path is approximately equal to integer multiples of the separation of the peaks in said coherence function.

3. The system according to claim 1 wherein said single beam from said light source defines a coherence function having peaks in accordance with said different wavelength bands, and said collected light of said imaging beam by said confocal optics defines a confocal response having a peak, in which said second optics overlap one of said peaks of said coherence function present in said reference beam with said peak of said confocal response.

4. The system according to claim 1 wherein said confocal optics scan and focus said imaging beam along a focal plane in said tissue, and said reference beam at said second optics provides for spatially limiting the light of said return beam to a region of said tissue in said focal plane.

5. The system according to claim 1 wherein said confocal optics scan and focus said imaging beam along a focal plane in said tissue, and said detector provides for spatially limiting the light of the return beam to a region of said tissue in said focal plane.

6. The system according to claim 1 wherein said processing means further comprises means for demodulating said electrical signals to obtain data representative of said image of said tissue section.

7. The system according to claim 1 wherein said light source comprises a plurality of light sources producing a plurality of different beams at each of said different wavelength bands, and third optical elements for combining said plurality of beams into said single beam.

8. The system according to claim 7 wherein said image of said tissue section has an axial resolution dependent on at least the number of said plurality of light sources.

9. The system according to claim 7 wherein said light sources are laser sources.

10. The system according to claim 9 wherein said laser sources are diode lasers.

11. The system according to claim 1 wherein said single beam of long coherence length light has a plurality of different non-overlapping wavelength bands of coherence length greater than one millimeter.

12. The system according to claim 1 wherein said confocal optics provide a numerical aperture below 0.7.

13. The system according to claim 1 wherein said scanning and collecting means comprises a deflector for scanning said imaging beam in at least two dimensions.

14. The system according to claim 1 wherein said first and second optics each represent a beam splitter.

15. The system according to claim 1 wherein said different wavelength bands are in the infrared spectrum of light.

16. The system according to claim 1 wherein said imaging beam is scanned and focused by said confocal optics to an illumination spot.

17. The system according to claim 1 wherein said confocal optics have a numerical aperture and the tissue section imaged has an axial resolution which is the same as that provided by other confocal optics having a higher one of said numerical aperture when used with a single wavelength beam.

18. The system according to claim 1 wherein said detector further comprises a photodetector and means for spatial limiting the return beam onto said photodetector.

19. The system according to claim 18 wherein said spatial limiting means limits the returned light incident the photodetector to a particular region of the tissue.

20. The system according to claim 1 wherein said confocal optics define a numerical aperture, and said tissue section imaged has an axial resolution in accordance with at least the numerical aperture of the confocal optics and the number of different beams providing said single beam.

21. The system according to claim 1 wherein said wavelength bands are equidistant from each other.

22. The system according to claim 1 wherein said long coherence length light represents light with coherence length greater than one millimeter.

23. A method for confocal microscopy which images sections of tissue comprising the steps of:
    producing a single beam of long coherence length light having a plurality of different non-overlapping wavelength bands;
    separating said single beam into an imaging beam and a reference beam;
    modulating the phase of said reference beam;
    scanning and focusing said imaging to said tissue and collecting returned light from said tissue;

interacting said returned light with said modulated reference beam to provide a combined return beam which has heterodyne components;

detecting said combined return beam to provide electrical signals corresponding to said components; and processing said electrical signals to produce an image of said tissue section.

24. The method according to claim 23 wherein said single beam of long coherence length light represents a combination of each of said plurality of different non-overlapping wavelength bands have a coherence length greater than one millimeter.

25. The method according to claim 23 wherein said single beam defines a coherence function having peaks in accordance with said different wavelength bands, and said imaging beam transverses along a first path from said first optics to said tissue and from said tissue to said second optics, and said reference beam transverses along a second path from said first optics through said optical modulator to said second optics, in which the difference in length of said first path from said second path is approximately equal to integer multiples of the separation of the peaks of said coherence function.

26. The method according to claim 23 wherein said single beam from said light source defines a coherence function having peaks in accordance with said different wavelength bands, said collected light of said imaging beam defines a confocal response having a peak, and said interacting step further comprising overlapping one of said peaks of said coherence function present in said reference beam with said peak of said confocal response.

27. The method according to claim 23 wherein said scanning and focusing step scans and focus said imaging beam along a focal plane in said tissue, and said method further comprises the step of spatially limiting the light of said return beam to a region of said tissue in said focal plane.

28. The method according to claim 23 wherein said processing step further comprises the step of demodulating said electrical signals to obtain data representative of said image of said tissue section.

29. The method according to claim 23 wherein said step of producing a single beam of long coherence length light is carried out with the aid of a plurality of light sources which produce said plurality of different beams at each of said different wavelength bands and optical elements for combining said plurality of different beams into said single beam.

30. The method according to claim 29 wherein said image of said tissue section has an axial resolution dependent on at least the number of said plurality of light sources.

31. The method according to claim 23 wherein said confocal optics provide a numerical aperture below 0.7.

32. The method according to claim 23 wherein said different wavelength bands are in the infrared spectrum of light.

33. The method according to claim 23 wherein said imaging beam is scanned and focused to an illumination spot.

34. The method according to claim 23 wherein said scanning and focusing step is carried out with confocal optics having at least an objective lens through which said imaging beam is focused below the surface of the tissue, said objective lens has a numerical aperture, and said tissue section imaged has an axial resolution in accordance with at least the numerical aperture of the objective lens, and the number of different beams providing said single beam.

35. The method according to claim 23 further comprising the step of spatially limiting the combined return beam before said detecting step is carried out.

36. The method according to claim 23 wherein said wavelength bands are equidistant from each other.

37. The method according to claim 23 wherein said long coherence length light represents light with coherence length greater than one millimeter.

38. A system for imaging below the surface of an object comprising:

a confocal optical system for scanning said object and collecting light from said a plurality of light sources operating at different wavelength bands of long coherence length light which are combined into a single beam for illuminating said confocal optical system;

means for splitting said single beam into an imaging beam for illuminating said confocal optical system and a reference beam;

means for modulating said reference beam;

means for combining said collected light from said object and said modulated reference beam;

means for detecting the portion of said combined light representing a section to produce electrical signals representative of said section; and means for producing an image of said section of said object in accordance with electrical signals.

39. The system according to claim 38 wherein said long coherence length light represents light with coherence length greater than one millimeter.

40. A method for producing an image of a section of an object using confocal optics which scan and collect light from said object comprising the steps of:

combining into a single beam light from a plurality of beams of different wavelength bands of long coherence length light;

splitting said single beam into an imaging beam for illuminating said object via optical system and a reference beam;

modulating said reference beam;

combining light collected by said confocal optical system and said modulated reference beam;

detecting the portion of said combined light representing said section of said object to produce electrical signals representative of said section; and producing an image of said section in accordance with said electrical signals.

41. The method according to claim 40 wherein said long coherence length light represents light with coherence length greater than one millimeter.

* * * * *